(12) United States Patent
Morgan

(10) Patent No.: US 8,441,383 B1
(45) Date of Patent: May 14, 2013

(54) PHOTONIC DIGITAL-TO-ANALOG CONVERSION (DAC) BASED ON RSOAS

(75) Inventor: Peter J. Morgan, Glenelg, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 125 days.

(21) Appl. No.: 13/046,293

(22) Filed: Mar. 11, 2011

(51) Int. Cl.
*H03M 1/00* (2006.01)
(52) U.S. Cl.
USPC .......................................... 341/137; 341/144
(58) Field of Classification Search .................. 341/144, 341/137; 398/188, 183, 45
See application file for complete search history.

(56) References Cited

U.S. PATENT DOCUMENTS

| | | | |
|---|---|---|---|
| 7,061,414 B2* | 6/2006 | Chen et al. ..................... | 341/137 |
| 7,292,792 B2* | 11/2007 | Chen et al. ..................... | 398/183 |
| 7,403,711 B2* | 7/2008 | Chen et al. ..................... | 398/45 |
| 2005/0238367 A1* | 10/2005 | Chen et al. ..................... | 398/188 |
| 2007/0159369 A1* | 7/2007 | Currie et al. ................... | 341/144 |
| 2007/0159370 A1* | 7/2007 | Baginski et al. .............. | 341/144 |

* cited by examiner

*Primary Examiner* — Jean B Jeanglaude
(74) *Attorney, Agent, or Firm* — Donna P. Suchy; Daniel M. Barbieri

(57) ABSTRACT

The present invention is directed to a photonic digital-to-analog converter (pDAC) system. The system may include a mode locked laser, an optical splitter connected to the laser, and a plurality of reflective semiconductor optical amplifiers connected to the splitter. The mode locked laser transmits a digital optical pulse train to the splitter. The splitter splits an optical pulse of the digital pulse train into multiple optical pulses and provides the multiple optical pulses to the amplifiers via a plurality of optical paths, at least two of the optical paths having different path lengths. The amplifiers amplify the multiple optical pulses and provide the amplified multiple optical pulses to the splitter. The splitter outputs an analog optical pulse train derived from the amplified multiple optical pulses. The system provides for faster sampling rate and lower jitter than Electrical Digital-to-Analog converter (eDAC) systems.

20 Claims, 5 Drawing Sheets

PHOTONIC DIGITAL-TO-ANALOG CONVERSION (DAC) BASED ON RSOAS

FIELD OF THE INVENTION

The present invention relates to the field of optical radio technology and particularly to system(s) and method(s) for providing photonic digital-to-analog conversion (DAC).

BACKGROUND OF THE INVENTION

Electrical Digital-to-Analog converters (eDACs)) are currently utilized for performing digital-to-analog conversion of signals. However, Electrical Digital-to-Analog converters (eDACs) may not provide sufficient sampling rates and may have unacceptable and/or undesirable levels of jitter for a number of applications.

Thus, it would be desirable to provide systems and methods for providing Digital-to-Analog Conversion which address the above-referenced shortcomings of currently available solutions.

SUMMARY OF THE INVENTION

Accordingly, an embodiment of the present invention is directed to a photonic digital-to-analog converter (pDAC) system, including: a mode locked laser configured for outputting a digital optical pulse train; an optical splitter, the splitter being connected to the laser, the splitter configured for receiving and splitting an optical pulse of the digital optical pulse train into multiple optical pulses; a plurality of reflective semiconductor optical amplifiers, the amplifiers being connected to the splitter via a plurality of optical paths, the amplifiers being modulated, the amplifiers configured for receiving the multiple optical pulses via the plurality of optical paths, the amplifiers configured for amplifying the multiple optical pulses by increasing amplitudes of the multiple optical pulses and providing the amplified multiple optical pulses to the splitter, at least two optical paths included in the plurality of optical paths having different path lengths, wherein the splitter is configured for receiving the amplified multiple optical pulses and outputting an analog optical pulse train based upon the amplified multiple optical pulses; a photodetector, the photodetector being connected to the optical splitter, the photodetector configured for receiving the analog optical pulse train from the optical splitter; a low pass filter, the low pass filter being connected to the photodetector, the low pass filter configured for receiving the analog optical pulse train from the photodetector, the low pass filter configured for providing an output based upon the analog optical pulse train, the output being an electrical reconstructed waveform; wherein the splitter, the amplifiers and the optical paths are connected to a chip to form a photonic integrated circuit; wherein a pulse rate of the analog optical pulse train is greater than a pulse rate of the digital optical pulse train.

An additional embodiment of the present invention is directed to a photonic digital-to-analog converter (pDAC) system, including: a mode locked laser configured for outputting a digital optical pulse train; an optical splitter, the splitter being connected to the laser, the splitter configured for receiving and splitting an optical pulse of the digital optical pulse train into multiple optical pulses; a plurality of electro-absorption modulators, the modulators being connected to the splitter via a plurality of interconnects, the modulators configured for receiving the multiple optical pulses from the splitter via the plurality of interconnects, the modulators configured for modulating the multiple optical pulses by increasing intensities of the multiple optical pulses and outputting the modulated multiple optical pulses; a plurality of reflective semiconductor optical amplifiers, the amplifiers being connected to the plurality of electro-absorption modulators via a plurality of optical paths, the amplifiers configured for receiving the modulated multiple optical pulses via the plurality of optical paths, the amplifiers configured for amplifying the modulated multiple optical pulses by increasing amplitudes of the modulated multiple optical pulses and providing the amplified modulated multiple optical pulses to the electro-absorption modulators via the plurality of optical paths, at least two optical paths included in the plurality of optical paths having different path lengths, wherein the plurality of electro-absorption modulators are configured for receiving the amplified modulated multiple optical pulses, increasing intensities of the amplified modulated multiple optical pulses to the splitter to produce amplified double pass modulated multiple optical pulses, and providing the amplified double pass modulated multiple optical pulses to the splitter, the splitter being configured for receiving the amplified double pass modulated multiple optical pulses and outputting an analog optical pulse train based upon the amplified double pass modulated multiple optical pulses; a photodetector, the photodetector being connected to the optical splitter, the photodetector configured for receiving the analog optical pulse train from the optical splitter; a low pass filter, the low pass filter being connected to the photodetector, the low pass filter configured for receiving the analog optical pulse train from the photodetector, the low pass filter configured for providing an output based upon the analog optical pulse train, the output being an electrical reconstructed waveform, wherein the splitter, the amplifiers, the modulators and the optical paths are connected to a chip to form a photonic integrated circuit; wherein a pulse rate of the analog optical pulse train is greater than a pulse rate of the digital optical pulse train.

A further embodiment of the present invention is directed to a method for providing photonic digital-to-analog conversion via a photonic digital-to-analog converter (pDAC) system, the method including: transmitting a digital optical pulse train from a mode locked laser to an optical splitter; separating, via the splitter, an optical pulse of the digital optical pulse train into multiple optical pulses; directing the multiple optical pulses from the splitter to a plurality of reflective semiconductor optical amplifiers via a plurality of optical paths, at least two optical paths included in the plurality of optical paths having different path lengths; amplifying the multiple optical pulses via the plurality of amplifiers by increasing amplitudes of the multiple optical pulses; directing the amplified multiple optical pulses from the plurality of amplifiers to the splitter via the plurality of optical paths; receiving at the splitter the plurality of amplified multiple optical pulses, and outputting an analog optical pulse train from the splitter to a photodetector, the output analog pulse train being derived from the plurality of amplified multiple optical pulses; receiving the analog optical pulse train at the photodetector and directing the analog optical pulse train from the photodetector to a low pass filter; and receiving the analog optical pulse train at the low pass filter and outputting an electrical signal from the low pass filter, the electrical signal being based upon the analog optical pulse train.

A still further embodiment of the present invention is directed to a method for providing photonic digital-to-analog conversion via a photonic digital-to-analog converter (pDAC) system, the method including: transmitting a digital optical pulse train from a mode locked laser to an optical splitter; separating, via the splitter, an optical pulse of the digital optical pulse train into multiple optical pulses; directing the multiple optical pulses from the splitter to a plurality of electro-absorption modulators; modulating the multiple optical pulses via the plurality of electro-absorption modulators by increasing intensities of the multiple optical pulses and outputting the modulated multiple optical pulses to a plurality of reflective semiconductor optical amplifiers via a plurality of optical paths, at least two optical paths included in the plurality of optical paths having different path lengths; amplifying the modulated multiple optical pulses via the plurality of amplifiers by increasing amplitudes of the modulated multiple optical pulses; directing the amplified modulated multiple optical pulses from the plurality of amplifiers to the plurality of electro-absorption modulators via the plurality of optical paths; modulating the amplified modulated multiple optical pulses via the plurality of electro-absorption modulators by increasing intensities of the amplified modulated multiple optical pulses to produce amplified double pass modulated multiple optical pulses and providing the amplified double pass modulated multiple optical pulses to the splitter; receiving the amplified double pass modulated multiple optical pulses at the splitter and outputting an analog optical pulse train from the splitter to a photodetector, the output analog pulse train being derived from the amplified double pass modulated multiple optical pulses; receiving the analog optical pulse train at the photodetector and directing the analog optical pulse train from the photodetector to a low pass filter; and receiving the analog optical pulse train at the low pass filter and outputting an electrical signal from the low pass filter, the electrical signal being based upon the analog optical pulse train.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently, Electrical Digital-to-Analog converters (eDACs)) may be utilized for performing digital-to-analog conversion of signals. However, Electrical Digital-to-Analog converters (eDACs) may be limited to sampling rates of approximately 20 Giga-samples per second (20 GS/s) at low bit resolution. Alternatively, Photonic Digital-to-Analog converters (pDACs), as disclosed herein, may be able to generate pulses at many tens of Giga pulses per second (GP/s). For instance, pDACs may be able to generate pulse rates greater than 100 GP/s (ex.—to several tens of Gigahertz range), thereby providing higher pulse (ex.—sampling) rates than eDACs. Further, pDACs may have lower jitter than eDACs. A major application for pDACs may be for high resolution arbitrary waveform generation. For instance, pDACs may be implemented in Radar, Radio Frequency (RF), and microwave applications. Further, pDACs may be implemented in and/or with optical radios. The present disclosure provides embodiments of pDAC systems and methods which may promote provision of the above-referenced advantages.

Figure 1:
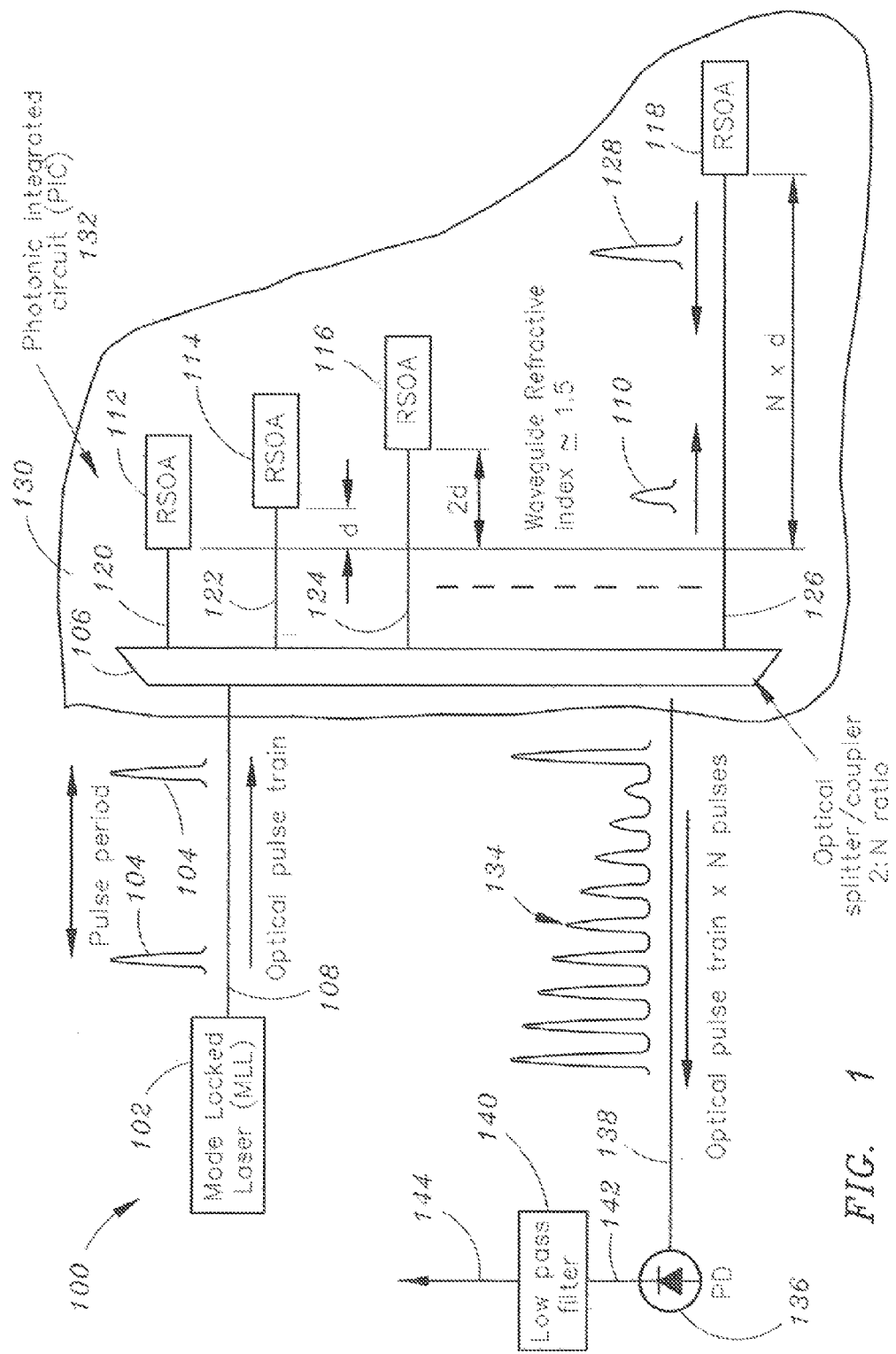
FIG. 1 is a block diagram schematic of a photonic digital-to-analog converter (pDAC) system in accordance with an exemplary embodiment of the present invention.

Referring to FIG. 1, a photonic digital-to-analog converter (pDAC) system in accordance with an exemplary embodiment of the present disclosure is shown. In exemplary embodiments of the present disclosure, the system 100 may include a mode locked laser (MLL) 102. The mode locked laser 102 may be configured for providing (exs.—generating and/or outputting) a plurality of optical pulses (exs.—an optical pulse train, an optical stream of pulses, a stream of optical signals, a stream of digital signals, a digital optical pulse train, a digital signal) 104. For example, the optical pulses 104 may be output from the mode locked laser 102 at a pulse rate of ten Gigapulses per second (10 GP/s), and may have one hundred picoseconds (100 pS) spacing. Further, the mode locked laser 102 may be capable of sub-femtosecond jitter.

In an embodiment of the present disclosure, the system 100 may further include an optical splitter/coupler 106. The optical splitter 106 may be connected to the mode locked laser 102 via an interconnect 108. The mode locked laser 102 may be configured for providing (exs.—transmitting, outputting) the plurality of optical pulses 104 to the optical splitter 106, said optical pulses 104 being directed from the mode locked laser 102 to the optical splitter 106 via the interconnect 108. The optical splitter 106 may be configured for splitting at least one pulse included in the plurality of optical pulses 104 into multiple (ex.—a plurality of) optical pulses (ex.—optical signals) 110.

In exemplary embodiments of the present disclosure, the system 100 may further include a plurality of reflective semiconductor optical amplifiers (RSOAs) 112, 114, 116, 118. The plurality of reflective semiconductor optical amplifiers (112, 114, 116, 118) may be connected to the optical splitter 106 via a plurality of interconnects (ex.—low loss interconnect waveguides) 120, 122, 124, 126. For instance, the refractive index of one or more of the waveguides (120, 122, 124 and/or 126) may be approximately or equal to 1.5. In exemplary embodiments of the present disclosure, the reflective semiconductor optical amplifiers (112, 114, 116, 118) may be modulated.

In further embodiments of the present disclosure, the optical splitter 106 may be connected to a first RSOA 112 via a first interconnect 120. The first interconnect 120 may provide a first optical path, along which a first optical pulse of the multiple optical pulses 110 may be directed. For example, the first optical pulse of the multiple optical pulses 110 may be directed from optical splitter 106 to the first RSOA 112 via the first interconnect 120 (ex.—along the first optical path 120). Further, the optical splitter 106 may be connected to a second RSOA 114 via a second interconnect 122. The second interconnect 122 may provide a second optical path, along which a second optical pulse of the multiple optical pulses 110 may be directed. For instance, the second optical pulse of the multiple optical pulses 110 may be directed from the optical splitter 106 to the second RSOA 114 via the second interconnect 122.

In exemplary embodiments of the present disclosure, the second optical path 122 may have a different (exs.—longer) path length than the first optical path 120. For example, the second optical path 122 may be one millimeter (1 mm) longer than the first optical path 120. Because the second optical path 122 has a longer path length than the first optical path 120, the time it takes for the second optical pulse of the multiple optical pulses 110 to propagate between the optical splitter 106 and the second RSOA 114 via the second optical path 122 may be longer than the time it takes for the first optical pulse of the multiple optical to propagate between the optical splitter 106 and the first RSOA 112 via the first optical path 120. This time difference may be referred to as the propagation delay. For example, the 1 millimeter difference in length between the first optical path 120 and the second optical path 122 may result in a propagation delay of approximately five picoseconds (5 pS).

In further embodiments of the present disclosure, after the first optical pulse of the multiple optical pulses 110 propagates to (ex.—arrives at) the first RSOA 112 via the first optical path 120, the first RSOA 112 may be configured for increasing an amplitude of (ex.—amplifying) the first optical pulse. Further, after the second optical pulse of the multiple optical pulses 110 propagates to (ex.—arrives at) the second RSOA 114 via the second optical path 122, the second RSOA 114 may be configured for increasing an amplitude of (ex.—amplifying) the second optical pulse of the multiple optical pulses 110. As mentioned above, the RSOAs (112, 114, 116, 118) may be modulated. Further, the first RSOA 112 may be configured for amplifying the first optical pulse of the multiple optical pulses 110 to a first amplitude, and the second RSOA 114 may be configured for amplifying the second optical pulse of the multiple optical pulses 110 to a second amplitude. For example, the second amplitude may be different from (ex.—higher than) the first amplitude. Thus, the RSOAs (112, 114, 116, 118) may be configured for providing a plurality of amplified optical pulses 128 based on the multiple optical pulses 110.

In exemplary embodiments of the present disclosure, the amplified first optical pulse included in the plurality of amplified optical pulses 128 may be directed from (ex—reflected by) the first RSOA 112 back towards the optical coupler 106 via (ex.—along) the first optical path 120. Further, the amplified second optical pulse included in the plurality of amplified optical pulses 128 may be directed from (ex.—reflected by) the second RSOA 114 back towards the optical coupler 106 via (ex.—along) the second optical path 122. Because the second optical path 122 has a longer path length than the first optical path 120, the time it takes for the second amplified optical pulse included in the plurality of amplified optical pulses 128 to propagate from the second RSOA 114 back to the optical coupler 106 via the second optical path 122 may be longer than the time it takes for the first amplified optical pulse included in the plurality of amplified optical pulses 128 to propagate from the first RSOA 112 back to the optical coupler 106 via the first optical path 120. This time difference (ex.—propagation delay) may result in a fixed relative delay between the reflected pulses 128. For instance, as mentioned above, a 1 millimeter difference in length between the first optical path 120 and the second optical path 122, may result in a propagation delay of approximately five picoseconds (5 pS) between the first RSOA 112 and the second RSOA 114. Thus, the round-trip propagation delay (ex.—time difference for signals (pulses) propagating from the splitter to the RSOAs and back to the splitter/coupler) between the first RSOA 112 and the second RSOA 114 may be approximately ten picoseconds (10 pS).

In further embodiments of the present disclosure, the optical splitter/coupler 106, the RSOAs (112, 114, 116, 118), and the interconnects (exs.—waveguides, optical paths) (120, 122, 124, 126) may be connected to and/or formed upon a chip 130 to form a photonic integrated circuit (PIC) 132. The PIC 132 may implement very high precision photolithography (ex.—the photolithography limit may be less than 0.1 micrometers), thereby allowing jitter between the optical pulses to be small (ex.—less than 0.1 femtoseconds).

As mentioned above, each optical pulse 104 provided to the optical splitter 106 may be split into multiple optical pulses 110. The number of optical pulses into which the initial optical pulse 104 is split may be varied as desired, depending upon the configuration of the system 100 (ex.—the type of optical splitter used, etc.). Further, the number of interconnects (120, 122, 124 or 126) and the number of RSOAs (112, 114, 116, 118) implemented may be correspondingly varied, since each of said multiple optical pulses 110 may propagate to its own corresponding RSOA via its own corresponding interconnect. Consequently, the number of amplified optical pulses 128 provided to the optical splitter may be correspondingly varied, since each of said multiple optical pulses 110 may be amplified by their corresponding RSOA and directed (ex.—reflected) back to the optical splitter/coupler 106 as amplified optical pulses 128. Thus, the system 100 may be configured for providing a desired number of amplified optical pulses 128 to the optical coupler 106.

In further embodiments of the present disclosure, the optical coupler 106 may be configured for outputting an optical pulse train (exs.—an analog optical pulse train, a stream of analog signals, an analog signal) 134, the optical pulse train 134 being based upon (exs.—derived from, including) the amplified optical pulses 128. In exemplary embodiments, the optical pulse train 134 output from the splitter/coupler 106 may have a higher pulse rate (ex.—100 GP/s) than the pulse rate (ex.—10 GP/s) of the optical pulse train 104 provided to the splitter/coupler 106 from the mode locked laser 102. Further, optical pulse train 134 may have a pulse amplitudes range of $2^N$ (N=bit resolution for the system 100).

In exemplary embodiments of the present disclosure, the system 100 may further include a photodetector (ex.—a photodiode) 136, said photodetector 136 being connected to the optical coupler 106 via an interconnect 138. Optical pulse train (ex.—analog signal) 134 may be provided (ex.—may propagate) from the optical coupler 106 to the photodetector 136 via interconnect 138. Further, the system 100 may include a filter (ex.—a low pass filter) 140. The low pass filter 140 may be connected to the photodetector 136 via an interconnect 142. The optical pulse train (ex.—analog signal) 134 may be provided (ex.—may propagate) from the photodetector 136 to the low pass filter 140 via interconnect 142. The low pass filter 140 may be configured for providing an output 144 based upon (ex.—derived from) the optical pulse train (ex.—analog signal) 134. For example, the output 144 may be an analog electrical waveform (ex.—an electrical reconstructed waveform). As mentioned above, the RSOAs (112, 114, 116, 118) may be modulated, which may thereby provide an envelope shape to the analog electrical waveform 144.

Further, the system 100 may operate at a bit resolution of $2^N$ (N=the number of bits of the pDAC system). Although bit resolution of the system 100 may still be somewhat limited by the resolution of electrical Digital-to-Analog Converters (eDACs) driving the RSOAs (112, 114, 116, 118) and by the bandwidth of the RSOAs (ex.—approximately 10 Gigahertz), the sampling resolution provided by the system 100 may be greatly increased with bit resolution significantly increased compared to eDACs at the same very high sampling rate. The system 100 does not utilize optical interference, but only amplitude modulation to provide the above-described advantages.

Figure 2:
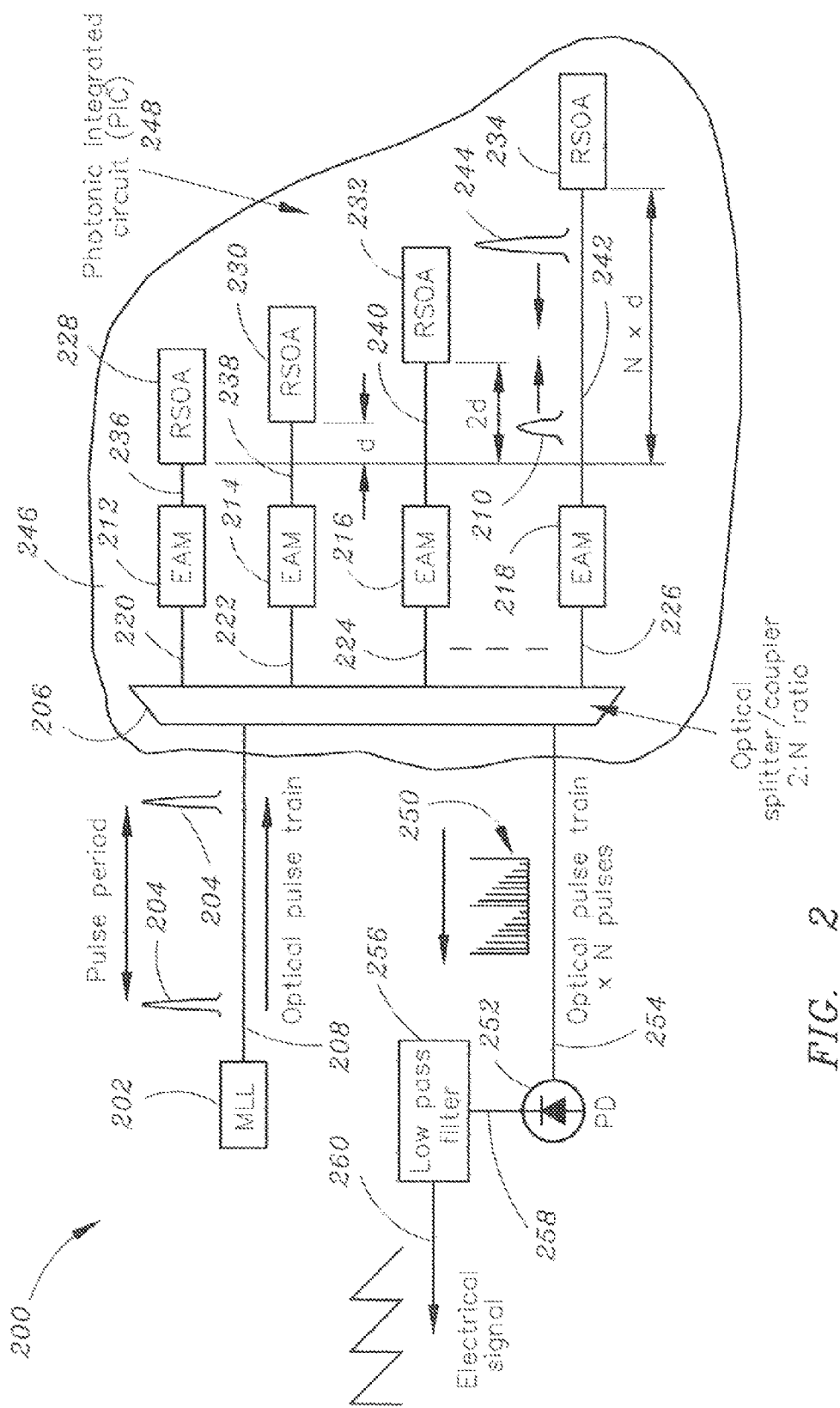
FIG. 2 is a block diagram schematic of a photonic digital-to-analog converter (pDAC) system in accordance with a further exemplary embodiment of the present invention.

Referring to FIG. 2, a photonic digital-to-analog converter (pDAC) system in accordance with a further exemplary embodiment of the present disclosure is shown. In exemplary embodiments of the present disclosure, the system 200 may include a mode locked laser (MLL) 202. The mode locked laser 202 may be configured for providing (exs.—generating and/or outputting) a plurality of optical pulses (exs.—an optical pulse train, an optical stream of pulses, a stream of optical signals, a stream of digital signals, a digital optical pulse train, a digital signal) 204. For example, the optical pulses 204 may be output from the mode locked laser 202 at a pulse rate of ten Gigapulses per second (10 GP/s), and may have one hundred picoseconds (100 pS) spacing. Further, the mode locked laser 202 may be capable of sub-femtosecond jitter.

In an embodiment of the present disclosure, the system 200 may further include an optical splitter/coupler 206. The optical splitter 206 may be connected to the mode locked laser 202 via an interconnect 208. The mode locked laser 202 may be configured for providing (exs.—transmitting, outputting) the plurality of optical pulses 204 to the optical splitter 206, said optical pulses 204 being directed from the mode locked laser 202 to the optical splitter 206 via the interconnect 208. The optical splitter 206 may be configured for splitting at least one pulse included in the plurality of optical pulses 204 into multiple (ex.—a plurality of) optical pulses (ex.—optical signals) 210.

In further embodiments of the present disclosure, the system 200 may further include a plurality of electro-absorption modulators (EAMs) 212, 214, 216, 218. For example, the EAMs may be Franz-Keldysh electro-absorption modulators (F-K EAMs). The plurality of EAMs (212, 214, 216, 218) may be connected to the optical splitter 206 via a plurality of interconnects (220, 222, 224, 226). The optical splitter 206 may be connected to a first EAM 212 via a first interconnect 220. A first optical pulse included in the multiple optical pulses 210 may be directed from the splitter 206 to the first EAM 212 via the first interconnect 220. Further, the optical splitter 206 may be connected to a second EAM 214 via a second interconnect 222. A second optical pulse included in the multiple optical pulses 210 may be directed from the splitter 206 to the second EAM 214 via the second interconnect 222.

In exemplary embodiments of the present disclosure, after the first optical pulse included in the multiple optical pulses 210 propagates to (ex.—arrives at) the first EAM 212 via interconnect 220, the first EAM 212 is configured for modulating the first optical pulse included in the multiple optical pulses 210. For example, the first EAM 212 may modulate an intensity of the first optical pulse included in the multiple optical pulses 210 via an electric voltage. Further, after the second optical pulse included in the multiple optical pulses 210 propagates to (ex.—arrives at) the second EAM 214 via interconnect 222, the second EAM 214 is configured for modulating the second optical pulse included in the multiple optical pulses 210.

In further embodiments of the present disclosure, the system 200 may further include a plurality of reflective semiconductor optical amplifiers (RSOAs) 228, 230, 232, 234. The plurality of RSOAs (228, 230, 232, 234) may be connected to the EAMs (212, 214, 216, 218) via a plurality of interconnects (ex.—low loss waveguides) 236, 238, 240, 242. For instance, the refractive index of one or more of the waveguides (236, 238, 240 and/or 242) may be approximately or equal to 1.5. Further, the reflective semiconductor optical amplifiers (228, 230, 232, 234) may be configured for operating in saturated mode.

In exemplary embodiments of the present disclosure, a first EAM 212 may be connected to a first RSOA 228 via a first interconnect 236. The first interconnect 236 may provide a first optical path, along which the modulated first optical pulse may be directed. For instance, the modulated first optical pulse may be directed from the first EAM 212 to the first RSOA 228 via the first interconnect 236 (ex.—along the first optical path 236). Further, a second EAM 214 may be connected to a second RSOA 230 via a second interconnect 238. The second interconnect 238 may provide a second optical path, along which the modulated second optical pulse may be directed. For example, the modulated second optical pulse may be directed from the second EAM 214 to the second RSOA 230 via the second interconnect 238 (ex.—along the second optical path 238).

In further embodiments of the present disclosure, the second optical path 238 may have a different (exs.—longer) path length than the first optical path 236. For example, the second optical path 238 may be one millimeter (1 mm) longer than the first optical path 236. Because the second optical path 238 has a longer path length than the first optical path 236, the time it takes for the modulated second optical pulse to propagate between the second EAM 214 and the second RSOA 230 via the second optical path 238 may be longer than the time it takes for the modulated first optical pulse to propagate between the first EAM 212 and the first RSOA 228 via the first optical path 236. This time difference may be referred to as the propagation delay. For example, the 1 millimeter difference in length between the first optical path 236 and the second optical path 238 may result in a propagation delay of approximately five picoseconds (5 pS).

In exemplary embodiments of the present disclosure, after the modulated first optical pulse propagates to (ex.—arrives at) the first RSOA 228 via the first optical path 236, the first RSOA 228 may be configured for increasing an amplitude of (ex.—amplifying) the modulated first optical pulse. Further, after the modulated second optical pulse propagates to the second RSOA 230 via the second optical path 238, the second RSOA 230 may be configured for increasing an amplitude of the modulated second optical pulse. For example, the first RSOA 228 may be configured for amplifying the modulated first optical pulse to a first amplitude and the second RSOA 230 may be configured for amplifying the modulated second optical pulse to a second amplitude. For instance, the second amplitude may be different from (ex.—higher than) the first amplitude.

In further embodiments of the present disclosure, the amplified modulated first optical pulse may be directed from (ex —reflected by) the first RSOA 228 towards the optical splitter 206. Further, the amplified modulated second optical pulse may be directed from (ex.—reflected by) the second RSOA 230 towards the optical splitter 206. For example, the amplified modulated first optical pulse may propagate from the first RSOA 228 to the first EAM 212 (via the first optical path 236), then from the first EAM 212 to the optical splitter 206 (via interconnect 220). Further, the amplified modulated second optical pulse may propagate from the second RSOA 230 to the second EAM 214 (via the second optical path 238), then from the second EAM 214 to the optical splitter 206 (via interconnect 222). After the amplified modulated first optical pulse propagates from the first RSOA 228 to the first EAM 212, the amplified modulated first optical pulse may be modulated a second time (ex.—double pass modulation) to produce an amplified double pass modulated first optical pulse. Further, after the amplified modulated second optical pulse propagates from the second RSOA 230 to the second EAM 214, the amplified modulated second optical pulse may be modulated a second time (ex.—double pass modulation) to produce an amplified double pass modulated second optical pulse.

Because the second optical path 238 has a longer path length than the first optical path 236, the time it takes for the amplified modulated second optical pulse to propagate from the second RSOA 230 to the second EAM 214 may be longer than the time it takes for the amplified modulated first optical pulse to propagate from the first RSOA 228 to the first EAM 212. This time difference (ex.—propagation delay) may result in a fixed relative delay between the reflected pulses (the amplified modulated optical pulses 244). For instance, as mentioned above, a 1 millimeter difference in length between the first optical path 236 and the second optical path 238, may result in a propagation delay of approximately five picoseconds (5 pS) between the first RSOA 228 and the second RSOA 230. Thus, the round-trip propagation delay (ex.—time difference for signals propagating from the splitter to the RSOAs and back to the splitter) between the first RSOA 228 and the second RSOA 230 may be approximately ten picoseconds (10 pS).

In further embodiments of the present disclosure, the optical splitter/coupler 206, the RSOAs (228, 230, 232, 234), the EAM-RSOA interconnects (exs.—waveguides, optical paths) (236, 238, 240, 242) and the optical splitter-EAM interconnects (220, 222, 224, 226) may be connected to and/or formed upon a chip 246 to form a photonic integrated circuit (PIC) 248. The PIC 248 may implement very high precision photolithography (ex.—the photolithography limit may be less than 0.1 micrometers), thereby allowing jitter between the optical pulses to be small (ex.—less than 0.1 femtoseconds).

As mentioned above, each optical pulse 204 provided to the optical splitter 106 may be split into multiple optical pulses 210 by the optical splitter 206. The number of optical pulses into which optical pulse 204 is split may be varied as desired, depending upon the configuration of the system 200 (ex.—the type of optical splitter used, etc.). Further, the number of EAMs implemented, the number of RSOAs implemented, the number of optical splitter-EAM interconnects implemented, and the number of EAM-RSOA interconnects implemented may be correspondingly varied, since each of said multiple optical pulses 210 may propagate from the optical splitter/coupler, to its own corresponding EAM, to its own corresponding RSOA, back to its own corresponding EAM, then back to the optical splitter via its own corresponding optical splitter-EAM interconnect and EAM-RSOA interconnect. Consequently, the number of amplified double pass modulated optical pulses provided to the optical splitter may be correspondingly varied, since each of said multiple optical pulses may be modulated by their corresponding EAM, amplified by their corresponding RSOA and directed (ex.—reflected) to the optical splitter/coupler 206 as an amplified double pass modulated optical pulse. Thus, the system 200 may be configured for providing a desired number of amplified double pass modulated optical pulses to the optical coupler 206.

In further embodiments of the present disclosure, the optical coupler 206 may be configured for outputting an optical pulse train (exs.—an analog optical pulse train, a stream of analog signals, an analog signal) 250, the optical pulse train 250 being based upon (exs.—derived from, including) the amplified double pass modulated optical pulses. In exemplary embodiments, the optical pulse train 250 output from the splitter/coupler 206 may have a higher pulse rate (ex.—100 GP/s) than the pulse rate (ex.—10 GP/s) of the optical pulse train 204 provided to the splitter/coupler 206 from the mode locked laser 202.

In exemplary embodiments of the present disclosure, the system 200 may further include a photodetector (ex.—a tunnel photodetector) 252, said photodetector 252 being connected to the optical coupler 206 via an interconnect 254. Optical pulse train (ex.—analog signal(s)) 250 may be provided (ex.—may propagate) from the optical coupler 206 to the photodetector 252 via interconnect 254. Further, the system 200 may include a filter (ex.—a low pass filter) 256. The low pass filter 256 may be connected to the photodetector 252 via an interconnect 254. The optical pulse train (ex.—analog signal(s)) 254 may be provided (ex.—may propagate) from the photodetector 252 to the low pass filter 256 via interconnect 258. The low pass filter 256 may be configured for providing an output 260 based upon (ex.—derived from) the optical pulse train (ex.—analog signal) 254. For example, the output 260 may be an analog electrical waveform (exs.—an electrical reconstructed waveform, an electrical signal).

In further embodiments of the present disclosure, the system 200, as described above, allows for optical pulses to propagate (ex.—to be routed) in a double pass (exs.—reflected pass, double pass modulation) manner through the EAMs (212, 214, 216, 218), thereby causing the amplified modulated optical pulses 244 to be modulated again as they propagate back to the EAMs (212, 214, 216, 218) from the RSOAs (228, 230, 232, 234), resulting in the amplified double pass modulated optical pulses. This double pass propagation allows the system 200 described above to provide improved extinction resolution (ex.—superior modulation extinction ratio) over currently available systems. For example, the extinction ratio (ER) of each EAM (212, 214, 216, 218) may be approximately thirty decibels (30 dB) for single pass, approximately sixty decibels (60 dB) for double pass. Further, the system 200 may operate at a bit resolution of $2^N$ (N=the number of bits of the pDAC system). For encoding based upon a bit resolution of $2^N$, three decibels (3 dB) per step may be required. Therefore, for 60 dB ER, resolution of 20 bits may be possible.

Figure 3:
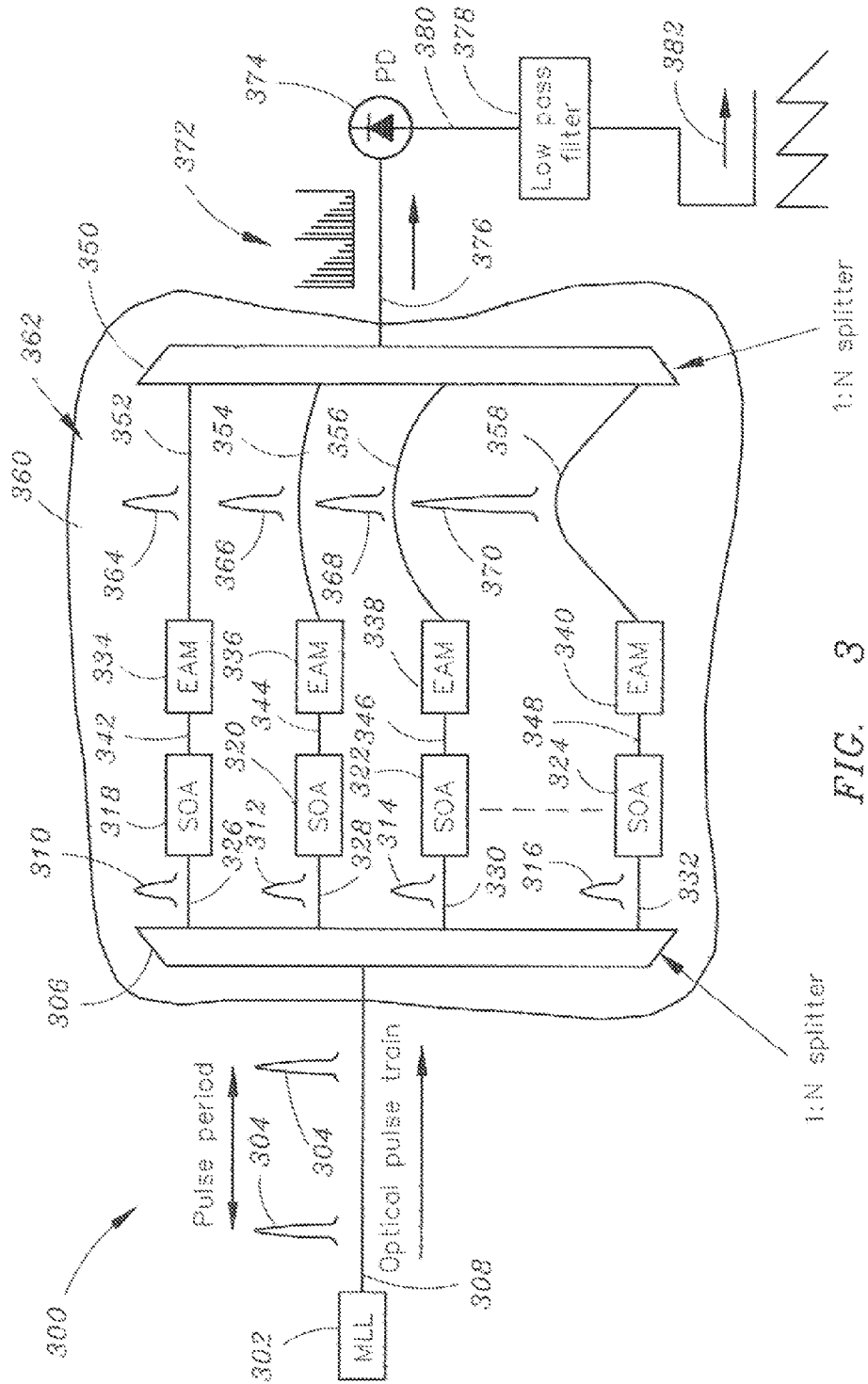
FIG. 3 is a block diagram schematic of a photonic digital-to-analog converter (pDAC) system in accordance with a still further exemplary embodiment of the present invention.

Referring to FIG. 3, a photonic digital-to-analog converter (pDAC) system in accordance with a further exemplary embodiment of the present disclosure is shown. In exemplary embodiments of the present disclosure, the system 300 may include a mode locked laser (MLL) 302. The mode locked laser 302 may be configured for providing (exs.—generating and/or outputting) a plurality of optical pulses (exs.—an optical pulse train, an optical stream of pulses, a stream of optical signals, a stream of digital signals, a digital optical pulse train, a digital signal) 304.

In an embodiment of the present disclosure, the system 300 may further include an optical splitter/coupler 306. The optical splitter 306 may be connected to the mode locked laser 302 via an interconnect 308. The mode locked laser 302 may be configured for providing (exs.—transmitting, outputting) the plurality of optical pulses 304 to the optical splitter 306, said optical pulses 304 being directed from the mode locked laser 302 to the optical splitter 306 via the interconnect 308. The optical splitter 306 may be configured for splitting at least one pulse included in the plurality of optical pulses 304 into multiple (ex.—a plurality of) optical pulses (ex.—optical signals) 310, 312, 314, 316.

In further embodiments of the present disclosure, the system 300 may further include a plurality of semiconductor optical amplifiers (SOAs) 318, 320, 322, 324. The plurality of SOAs (318, 320, 322, 324) may be connected to the optical splitter 306 via a plurality of interconnects (326, 328, 330, 332). The optical splitter 306 may be connected to a first SOA 318 via a first interconnect 326. A first optical pulse 310 included in the multiple optical pulses may be directed from the splitter 306 to the first SOA 318 via the first interconnect 326. Further, the optical splitter 306 may be connected to a second SOA 320 via a second interconnect 328. A second optical pulse 312 included in the multiple optical pulses may be directed from the splitter 306 to the second SOA 320 via the second interconnect 328.

In exemplary embodiments of the present disclosure, after the first optical pulse 310 propagates to (ex.—arrives at) the first SOA 318 via the first interconnect 326, the first SOA 318 may be configured for increasing an amplitude of (ex.—amplifying) the first optical pulse 310. Further, after the second optical pulse 312 propagates to the second SOA 320 via the second interconnect 328, the second SOA 320 may be configured for increasing an amplitude of the second optical pulse 312. For example, the first SOA 318 may be configured for amplifying the first optical pulse 310 to a first amplitude and the second SOA 320 may be configured for amplifying the second optical pulse to a second amplitude. For instance, the second amplitude may be different from (ex.—higher than) the first amplitude.

In further embodiments of the present disclosure, the system 300 may further include a plurality of electro-absorption modulators (EAMs) 334, 336, 338, 340. For example, the EAMs may be Franz-Keldysh electro-absorption modulators (F-K EAMs). The plurality of EAMs (334, 336, 338, 340) may be connected to the plurality of SOAs (318, 320, 322, 324) via a plurality of interconnects (342, 344, 346, 348). A first EAM 334 may be connected to the first SOA 318 via a first interconnect 342. The first amplified optical pulse may be directed from the first SOA 318 to the first EAM 334 via the first interconnect 342. Further, a second EAM 336 may be connected to the second SOA 320 via a second interconnect 344. The second amplified optical pulse may be directed from the second SOA 320 to the second EAM 336 via the second interconnect 344.

In exemplary embodiments of the present disclosure, after the amplified first optical pulse propagates to (ex.—arrives at) the first EAM 334 via interconnect 342, the first EAM 334 is configured for modulating the amplified first optical pulse. Further, after the amplified second optical pulse propagates to (ex.—arrives at) the second EAM 336 via interconnect 344, the second EAM 336 is configured for modulating the amplified second optical pulse.

In further embodiments, the system 300 may further include a second optical splitter/coupler 350. The second optical splitter/coupler 350 may be connected to the EAMs (334, 336, 338, 340) via a plurality of waveguides (352, 354, 356, 358). The path lengths of the waveguides (352, 354, 356, 358) may be incremented sequentially by displacement corresponding to time division equal to the quotient of the period of the pulses of the pulse train 304 being emitted by mode locked laser 302 divided by the incremental length.

In exemplary embodiments of the present disclosure, the modulated amplified first optical pulse 364 may be directed from the first EAM 334 to the second optical coupler 350 via a first waveguide 352. Further, the modulated amplified second optical pulse 366 may be directed from the second EAM 336 to the second optical coupler 350 via a second waveguide 354. Because the path lengths of the waveguides (352, 354, 356, 358) may be incremented sequentially as described above, a fixed relative propagation delay may exist between the modulated amplified optical pulses (364, 366, 368, 370) as they propagate along their respective optical paths (352, 354) to the second optical splitter/coupler 350.

In further embodiments of the present disclosure, the optical splitters/couplers (306, 350), the SOAs (318, 320, 322, 324) and the interconnects (exs.—waveguides, optical paths) may be connected to and/or formed upon a chip 360 to form a photonic integrated circuit (PIC) 362. In still further embodiments, an additional EAM may be connected along each optical path between the first optical splitter/coupler 306 and the second optical splitter/coupler 350.

As mentioned above, each optical pulse 304 provided to the first optical splitter 306 may be split into multiple optical pulses (310, 312, 314, 316). The number of optical pulses into which the initial optical pulse 304 is split may be varied as desired, depending upon the configuration of the system 300 (ex.—the type of optical splitter used, etc.). Further, the number of interconnects (ex.—waveguides), the number of SOAs (318, 320, 322, 324) implemented, and the number of EAMs (334, 336, 338, 340) implemented may be correspondingly varied. Consequently, the number of modulated amplified optical pulses (364, 366, 368, 370) provided to the second optical splitter 350 may be correspondingly varied. Thus, the system 300 may be configured for providing a desired number of modulated amplified optical pulses to the second optical coupler 350.

In further embodiments of the present disclosure, the second optical coupler 350 may be configured for outputting an optical pulse train (exs.—an analog optical pulse train, a stream of analog signals, an analog signal) 372, the optical pulse train 372 being based upon (exs.—derived from, including) the modulated amplified optical pulses (364, 366, 368, 370) received by the second optical coupler 350. In exemplary embodiments, the optical pulse train 372 output from the second splitter/coupler 350 may have a higher pulse rate than the pulse rate of the optical pulse train 304 provided to the first splitter/coupler 306 from the mode locked laser 302.

In exemplary embodiments of the present disclosure, the system 300 may further include a photodetector (ex.—a tunnel photodetector) 374, said photodetector 374 being connected to the second optical coupler 350 via an interconnect 376. Optical pulse train (ex.—analog signal) 372 may be provided (ex.—may propagate) from the second optical coupler 350 to the photodetector 374 via interconnect 376. Further, the system 300 may include a filter (ex.—a low pass filter) 378. The low pass filter 378 may be connected to the photodetector 374 via an interconnect 380. The optical pulse train (ex.—analog signal) 372 may be provided (ex.—may propagate) from the photodetector 374 to the low pass filter 378 via interconnect 380. The low pass filter 378 may be configured for providing an output 382 based upon (ex.—derived from) the optical pulse train (ex.—analog signal) 372. For example, the output 382 may be an analog electrical waveform (ex.—an electrical reconstructed waveform).

Figure 4:
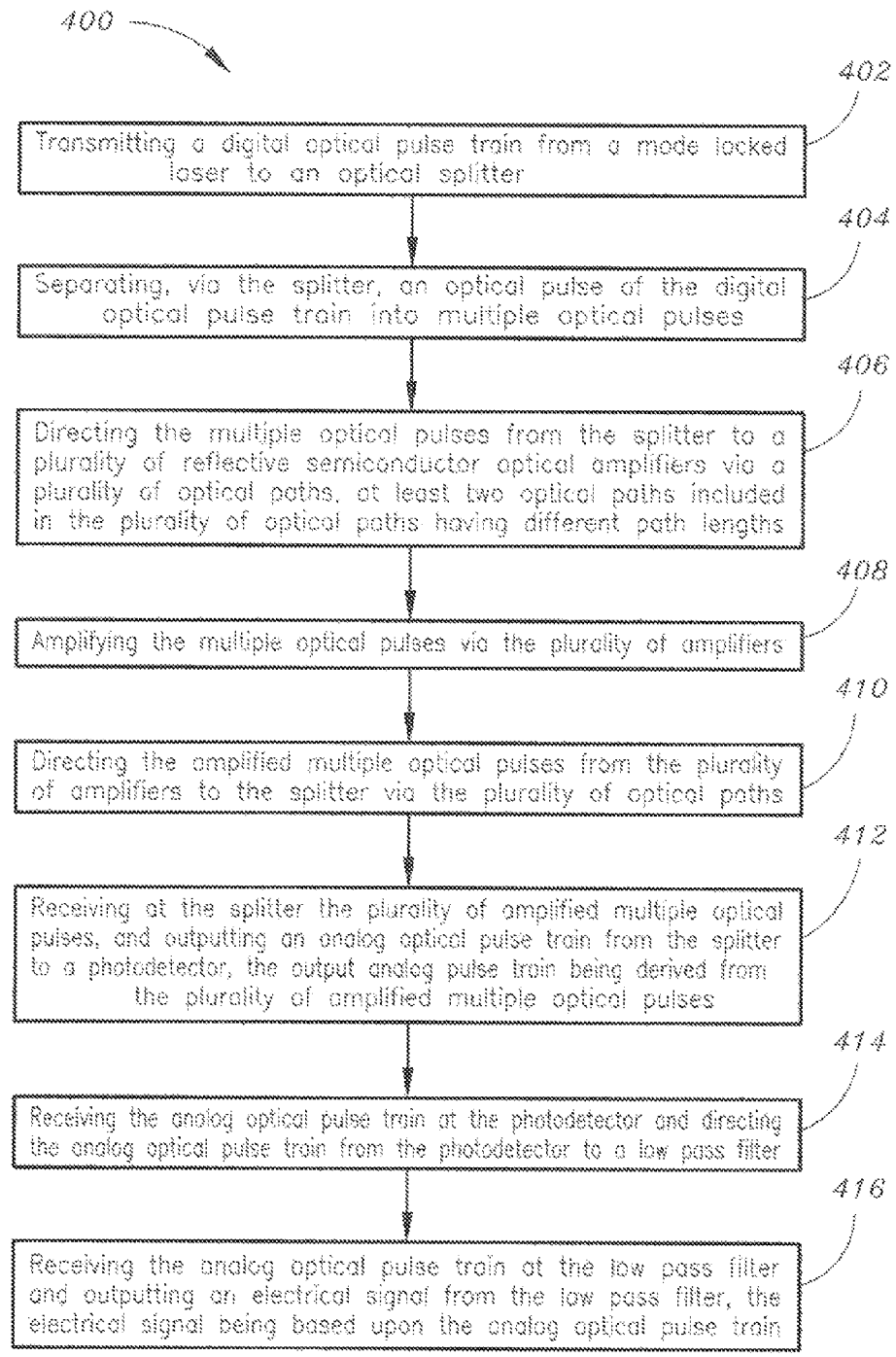
FIG. 4 depicts a flowchart illustrating a method for providing photonic digital-to-analog conversion in accordance with an exemplary embodiment of the present invention.

Referring to FIG. 4, a flowchart illustrating a method for providing photonic digital-to-analog conversion via a photonic digital-to-analog converter (pDAC) system (such as the system 100 shown in FIG. 1) in accordance with an exemplary embodiment of the present invention is provided. The method 400 may include the step of transmitting a digital optical pulse train from a mode locked laser to an optical splitter 402. The method 400 may further include the step of separating, via the splitter, an optical pulse of the digital optical pulse train into multiple optical pulses 404. The method 400 may further include the step of directing the multiple optical pulses from the splitter to a plurality of reflective semiconductor optical amplifiers via a plurality of optical paths, at least two optical paths included in the plurality of optical paths having different path lengths 406. The method 400 may further include the step of amplifying the multiple optical pulses via the plurality of amplifiers by increasing amplitudes of the multiple optical pulses 408.

Further, the method 400 may further include the step of directing the amplified multiple optical pulses from the plurality of amplifiers to the splitter via the plurality of optical paths 410. The method 400 may further include the step of receiving at the splitter the plurality of amplified multiple optical pulses, and outputting an analog optical pulse train from the splitter to a photodetector, the output analog pulse train being derived from the plurality of amplified multiple optical pulses 412. The method 400 may further include the step of receiving the analog optical pulse train at the photodetector and directing the analog optical pulse train from the photodetector to a low pass filter 414. The method 400 may further include the step of receiving the analog optical pulse train at the low pass filter and outputting an electrical signal from the low pass filter, the electrical signal being based upon the analog optical pulse train 416.

Figure 5:
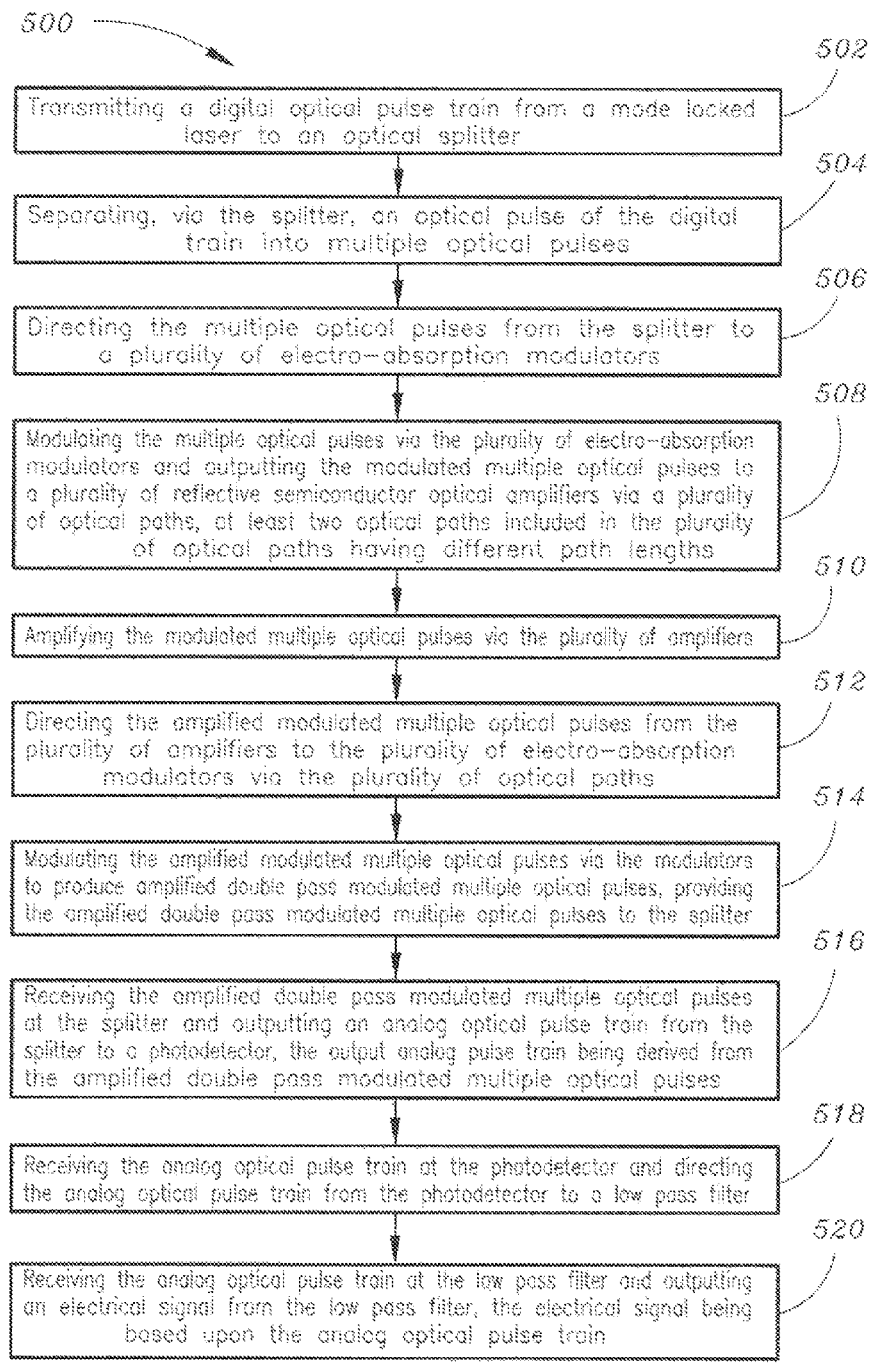
FIG. 5 depicts a flowchart illustrating a method for providing photonic digital-to-analog conversion in accordance with an exemplary embodiment of the present invention.

Referring to FIG. 5, a flowchart illustrating a method for providing photonic digital-to-analog conversion via a photonic digital-to-analog converter (pDAC) system (such as the system 200 shown in FIG. 2) in accordance with an exemplary embodiment of the present invention is provided. The method 500 may include the step of transmitting a digital optical pulse train from a mode locked laser to an optical splitter 502. The method 500 may further include the step of separating, via the splitter, an optical pulse of the digital optical pulse train into multiple optical pulses 504. The method 500 may further include the step of directing the multiple optical pulses from the splitter to a plurality of electro-absorption modulators 506. The method 500 may further include the step of modulating the multiple optical pulses via the plurality of electro-absorption modulators by increasing intensities of the multiple optical pulses and outputting the modulated multiple optical pulses to a plurality of reflective semiconductor optical amplifiers via a plurality of optical paths, at least two optical paths included in the plurality of optical paths having different path lengths 508.

Further, the method 500 may further include the step of amplifying the modulated multiple optical pulses via the plurality of amplifiers by increasing amplitudes of the modulated multiple optical pulses 510. The method 500 may further include the step of directing the amplified modulated multiple optical pulses from the plurality of amplifiers to the plurality of electro-absorption modulators via the plurality of optical paths 512. The method 500 may further include the step of modulating the amplified modulated multiple optical pulses via the plurality of electro-absorption modulators by increasing intensities of the amplified modulated multiple optical pulses to produce amplified double pass modulated multiple optical pulses and providing the amplified double pass modulated multiple optical pulses to the splitter 514. The method 500 may further include the step of receiving the amplified double pass modulated multiple optical pulses at the splitter and outputting an analog optical pulse train from the splitter to a photodetector, the output analog pulse train being derived from the amplified double pass modulated multiple optical pulses 516. The method 500 may further include the step of receiving the analog optical pulse train at the photodetector and directing the analog optical pulse train from the photodetector to a low pass filter 518. The method 500 may further include the step of receiving the analog optical pulse train at the low pass filter and outputting an electrical signal from the low pass filter, the electrical signal being based upon the analog optical pulse train 520.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A photonic digital-to-analog converter (pDAC) system, comprising:
   a mode locked laser configured for outputting a digital optical pulse train;
   an optical splitter, the splitter being connected to the laser, the splitter configured for receiving and splitting an optical pulse of the digital optical pulse train into multiple optical pulses;
   a plurality of reflective semiconductor optical amplifiers, the amplifiers being connected to the splitter via a plurality of optical paths, the amplifiers being modulated, the amplifiers configured for receiving the multiple optical pulses via the plurality of optical paths, the amplifiers configured for amplifying the multiple optical pulses by increasing amplitudes of the multiple optical pulses and providing the amplified multiple optical pulses to the splitter, at least two optical paths included in the plurality of optical paths having different path lengths,
   wherein the splitter is configured for receiving the amplified multiple optical pulses and outputting an analog optical pulse train based upon the amplified multiple optical pulses.

2. A photonic digital-to-analog converter (pDAC) system as claimed in claim 1, further comprising:
   a photodetector, the photodetector being connected to the optical splitter, the photodetector configured for receiving the analog optical pulse train from the optical splitter.

3. A photonic digital-to-analog converter (pDAC) system as claimed in claim 2, further comprising:
   a low pass filter, the low pass filter being connected to the photodetector, the low pass filter configured for receiving the analog optical pulse train from the photodetector, the low pass filter configured for providing an output based upon the analog optical pulse train, the output being an electrical reconstructed waveform.

4. A photonic digital-to-analog converter (pDAC) system as claimed in claim 1, wherein the splitter, the amplifiers and the optical paths are connected to a chip to form a photonic integrated circuit.

5. A photonic digital-to-analog converter (pDAC) system as claimed in claim 1, wherein a pulse rate of the analog optical pulse train is greater than a pulse rate of the digital optical pulse train.

6. A photonic digital-to-analog converter (pDAC) system, comprising:
   a mode locked laser configured for outputting a digital optical pulse train;
   an optical splitter, the splitter being connected to the laser, the splitter configured for receiving and splitting an optical pulse of the digital optical pulse train into multiple optical pulses;
   a plurality of electro-absorption modulators, the modulators being connected to the splitter via a plurality of interconnects, the modulators configured for receiving the multiple optical pulses from the splitter via the plurality of interconnects, the modulators configured for modulating the multiple optical pulses by increasing intensities of the multiple optical pulses and outputting the modulated multiple optical pulses;
   a plurality of reflective semiconductor optical amplifiers, the amplifiers being connected to the plurality of electro-absorption modulators via a plurality of optical paths, the amplifiers configured for receiving the modulated multiple optical pulses via the plurality of optical paths, the amplifiers configured for amplifying the modulated multiple optical pulses by increasing amplitudes of the modulated multiple optical pulses and providing the amplified modulated multiple optical pulses to the electro-absorption modulators via the plurality of optical paths, at least two optical paths included in the plurality of optical paths having different path lengths,
   wherein the plurality of electro-absorption modulators are configured for receiving the amplified modulated multiple optical pulses, increasing intensities of the amplified modulated multiple optical pulses to the splitter to produce amplified double pass modulated multiple optical pulses, and providing the amplified double pass modulated multiple optical pulses to the splitter, the splitter being configured for receiving the amplified double pass modulated multiple optical pulses and outputting an analog optical pulse train based upon the amplified double pass modulated multiple optical pulses.

7. A photonic digital-to-analog converter (pDAC) system as claimed in claim 6, further comprising:
   a photodetector, the photodetector being connected to the optical splitter, the photodetector configured for receiving the analog optical pulse train from the optical splitter.

8. A photonic digital-to-analog converter (pDAC) system as claimed in claim 7, further comprising:
   a low pass filter, the low pass filter being connected to the photodetector, the low pass filter configured for receiving the analog optical pulse train from the photodetector, the low pass filter configured for providing an output based upon the analog optical pulse train, the output being an electrical reconstructed waveform.

9. A photonic digital-to-analog converter (pDAC) system as claimed in claim 6, wherein the splitter, the amplifiers, the modulators and the optical paths are connected to a chip to form a photonic integrated circuit.

10. A photonic digital-to-analog converter (pDAC) system as claimed in claim 6, wherein a pulse rate of the analog optical pulse train is greater than a pulse rate of the digital optical pulse train.

11. A method for providing photonic digital-to-analog conversion via a photonic digital-to-analog converter (pDAC) system, the method comprising:
   transmitting a digital optical pulse train from a mode locked laser to an optical splitter;
   separating, via the splitter, an optical pulse of the digital optical pulse train into multiple optical pulses;
   directing the multiple optical pulses from the splitter to a plurality of reflective semiconductor optical amplifiers via a plurality of optical paths, at least two optical paths included in the plurality of optical paths having different path lengths; and
   amplifying the multiple optical pulses via the plurality of amplifiers by increasing amplitudes of the multiple optical pulses.

12. A method for providing photonic digital-to-analog conversion via a photonic digital-to-analog converter (pDAC) system as claimed in claim 11, the method further comprising:
   directing the amplified multiple optical pulses from the plurality of amplifiers to the splitter via the plurality of optical paths.

13. A method for providing photonic digital-to-analog conversion via a photonic digital-to-analog converter (pDAC) system as claimed in claim 12, the method further comprising:
   receiving at the splitter the plurality of amplified multiple optical pulses, and outputting an analog optical pulse train from the splitter to a photodetector, the output analog pulse train being derived from the plurality of amplified multiple optical pulses.

14. A method for providing photonic digital-to-analog conversion via a photonic digital-to-analog converter (pDAC) system as claimed in claim 13, the method further comprising:
   receiving the analog optical pulse train at the photodetector and directing the analog optical pulse train from the photodetector to a low pass filter.

15. A method for providing photonic digital-to-analog conversion via a photonic digital-to-analog converter (pDAC) system as claimed in claim 14, the method further comprising:
   receiving the analog optical pulse train at the low pass filter and outputting an electrical signal from the low pass filter, the electrical signal being based upon the analog optical pulse train.

16. A method for providing photonic digital-to-analog conversion via a photonic digital-to-analog converter (pDAC) system, the method comprising:
   transmitting a digital optical pulse train from a mode locked laser to an optical splitter;
   separating, via the splitter, an optical pulse of the digital optical pulse train into multiple optical pulses;
   directing the multiple optical pulses from the splitter to a plurality of electro-absorption modulators; and
   modulating the multiple optical pulses via the plurality of electro-absorption modulators by increasing intensities of the multiple optical pulses and outputting the modulated multiple optical pulses to a plurality of reflective semiconductor optical amplifiers via a plurality of optical paths, at least two optical paths included in the plurality of optical paths having different path lengths.

17. A method for providing photonic digital-to-analog conversion via a photonic digital-to-analog converter (pDAC) system as claimed in claim 16, the method further comprising:

amplifying the modulated multiple optical pulses via the plurality of amplifiers by increasing amplitudes of the modulated multiple optical pulses;

directing the amplified modulated multiple optical pulses from the plurality of amplifiers to the plurality of electro-absorption modulators via the plurality of optical paths; and modulating the amplified modulated multiple optical pulses via the plurality of electro-absorption modulators by increasing intensities of the amplified modulated multiple optical pulses to produce amplified double pass modulated multiple optical pulses and providing the amplified double pass modulated multiple optical pulses to the splitter.

18. A method for providing photonic digital-to-analog conversion via a photonic digital-to-analog converter (pDAC) system as claimed in claim 17, the method further comprising:

receiving the amplified double pass modulated multiple optical pulses at the splitter and outputting an analog optical pulse train from the splitter to a photodetector, the output analog pulse train being derived from the amplified double pass modulated multiple optical pulses.

19. A method for providing photonic digital-to-analog conversion via a photonic digital-to-analog converter (pDAC) system as claimed in claim 18, the method further comprising:

receiving the analog optical pulse train at the photodetector and directing the analog optical pulse train from the photodetector to a low pass filter.

20. A method for providing photonic digital-to-analog conversion via a photonic digital-to-analog converter (pDAC) system as claimed in claim 19, the method further comprising:

receiving the analog optical pulse train at the low pass filter and outputting an electrical signal from the low pass filter, the electrical signal being based upon the analog optical pulse train.

\* \* \* \* \*